US012794737B2

(12) United States Patent
Liu et al.

(10) Patent No.: US 12,794,737 B2
(45) Date of Patent: Nov. 10, 2026

(54) METHOD AND APPARATUS FOR DETERMINING SYMBOLS TRANSMITTED VIA ORTHOGONAL FREQUENCY DIVISION MULTIPLEX SIGNALS

(71) Applicants: Continental Automotive Technologies GmbH, Hannover (DE); Nanyang Technological University, Singapore (SG)

(72) Inventors: Xiaobei Liu, Singapore (SG); Yujie Liu, Singapore (SG); Yong Liang Guan, Singapore (SG); David Gonzalez Gonzalez, Frankfurt am Main (DE)

(73) Assignees: CONTINENTAL AUTOMOTIVE TECHNOLOGIES, Hannover (DE); NANYANG TECHNOLOGICAL UNIVERSITY, Singapore (SG)

( * ) Notice: Subject to any disclaimer, the term of this patent is extended or adjusted under 35 U.S.C. 154(b) by 387 days.

(21) Appl. No.: 18/571,425

(22) PCT Filed: Jun. 20, 2022

(86) PCT No.: PCT/EP2022/066642
§ 371 (c)(1),
(2) Date: Dec. 18, 2023

(87) PCT Pub. No.: WO2022/268666
PCT Pub. Date: Dec. 29, 2022

(65) Prior Publication Data

US 2024/0291694 A1 Aug. 29, 2024

(30) Foreign Application Priority Data

Jun. 25, 2021 (DE) ..................... 10 2021 116 549.0

(51) Int. Cl.
*H04L 25/02* (2006.01)

(52) U.S. Cl.
CPC ................................ *H04L 25/0236* (2013.01)

(58) Field of Classification Search
CPC ......... H04L 2025/03414; H04L 25/022; H04L 25/0236; H04L 25/03292; H04L 25/03305; H04L 25/03821
See application file for complete search history.

(56) References Cited

U.S. PATENT DOCUMENTS

2009/0103666 A1* 4/2009 Zhao .................. H04L 27/2647 375/341
2013/0064313 A1* 3/2013 Gatti ..................... H04L 25/022 375/316

(Continued)

FOREIGN PATENT DOCUMENTS

WO 2021080510 A1 4/2021

OTHER PUBLICATIONS

International Search Report and Written Opinion for International Application No. PCT/EP2022/066642, mailed Oct. 17, 2022, 9 pages.

Barhumi et al., "MLSE and MAP equalization for transmission over doubly selective channels," IEEE Transactions on Vehicle Technology, Oct. 2009, vol. 58, No. 8, pp. 4120-4128.

(Continued)

*Primary Examiner* — Romani Ohri
(74) *Attorney, Agent, or Firm* — Buchanan Ingersoll & Rooney PC

(57) ABSTRACT

An OFDM receiver has a first, pilot-aided channel estimation block, an output of which is provided, along with the received signal, to a first equaliser block. An output of the first equaliser block is provided, along with the received signal, to a second, data-aided channel estimation block. An output of the second channel estimation block is provided, along with the output of the first equaliser block and the received signal, to an adjustable interference cancellation block. The output of the interference cancellation block and the output of the second channel estimation block are provided to a second equaliser block. An output of the (Continued)

second equaliser block is provided to a de-mapping block, and is provided to the second channel estimation block and the interference cancellation block, for allowing an iterative repetition of second channel estimation, interference cancellation and second equalisation for a received signal.

13 Claims, 5 Drawing Sheets

(56) References Cited

U.S. PATENT DOCUMENTS

| | | | | |
|---|---|---|---|---|
| 2013/0128942 | A1 * | 5/2013 | Sikri | H04B 7/005<br>375/229 |
| 2020/0106648 | A1 * | 4/2020 | Medra | H04L 25/03292 |

OTHER PUBLICATIONS

Zhong et al., "Iterative channel estimation and data detection for MIMO-OFDM systems operating in time-frequency dispersive channels under unknown background noise," EURASIP Journal on Wireless Communications and Networking, 2013, 2013:182, 14 pages.

Tang et al., "Pilot-assisted time-varying channel estimation for OFDM systems," IEEE Transactions on Signal Processing, May 2007, vol. 55, No. 5, pp. 2226-2238.

Raviteja et al., "Interference cancellation and iterative detection for orthogonal time frequency space modulation," IEEE Transactions on Wireless Communications, Oct. 2018, vol. 17, No. 10, pp. 6501-6515.

Office Action (Communication pursuant to Article 94(3) EPC) issued Apr. 2, 2026, by the European Patent Office in corresponding European Patent Application No. 22 738 339.5-1206. (4 pages).

* cited by examiner

METHOD AND APPARATUS FOR DETERMINING SYMBOLS TRANSMITTED VIA ORTHOGONAL FREQUENCY DIVISION MULTIPLEX SIGNALS

CROSS REFERENCE TO RELATED APPLICATIONS

This application is the U.S. National Phase Application of PCT International Application No. PCT/EP2022/066642, filed Jun. 20, 2022, which claims priority to German Patent Application No. 10 2021 116 549.0, filed Jun. 25, 2021, the contents of such applications being incorporated by reference herein.

FIELD OF THE INVENTION

The present invention relates to a method of determining symbols wirelessly transmitted using orthogonal frequency division multiplexing (OFDM) over a communication channel subject to disturbances, in particular disturbances caused by moving transmitters and/or receivers. The present invention also relates to a receiver implementing the method.

BACKGROUND OF THE INVENTION

In mobile radio communication, radar sensing and satellite communication signal distortion in the communication channel poses a significant problem for proper decoding of received signals. Signal distortion may include time-varying channel properties, inter alia the notorious Doppler shifts or spreads, i.e., frequency dispersiveness, which are caused by moving transmitters, receivers, or signal reflectors. When transmitter and receiver are approaching, the received frequency will increase, and when distance between transmitter and receiver is increasing, the received frequency will decrease. In communication systems transmitting data using OFDM the frequency shift due to the relative movement between transmitter and receiver may cause the frequency-shifted carrier to interfere with the neighbouring carrier, also referred to as intercarrier interference. Intercarrier interference may affect the entire OFDM block and presents a challenge to symbol detection functions. Signal distortion may also be frequency-selective, caused, inter alia, by multipath propagation, i.e., a communication channel may be subject to time dispersiveness.

Thus, in general, practical wireless channels are characterized as doubly selective fading channels. The high time and frequency dispersiveness of the doubly selective channels can significantly distort the transmitted signal, and thus efficient channel estimation and equalization techniques are needed.

In high mobility systems with doubly selective fading, the fading time-variation will destroy the orthogonality among subcarriers and introduce inter-carrier interference, which will seriously degrade the performance of OFDM-based transmission systems.

As it is well known, in OFDM transmission systems, different symbols of a transmission block are transmitted simultaneously on multiple subcarrier frequencies that are spaced apart from each other. FIG. 1 shows an exemplary representation of an OFDM communication system. On the transmitter side, serial binary data is input to a signal mapper, which may, e.g., provide a signal modulated in accordance with binary phase shift keying (BPSK), quadrature phase shift keying (QPSK), quadrature amplitude modulation (QAM) modulation schemes. The complex values of the modulated data are then mapped onto individual subcarriers and are thus available in parallel (block: S/P), and one or more pilot signals can be added or inserted. The resulting group or block of subcarriers, which constitute the data in the frequency domain, are then subjected to an inverse Fourier transform, e.g., an inverse discrete Fourier transform (block: IDFT). The inverse Fourier transform transforms the signal from the frequency domain to the time domain, which effectively corresponds to a parallel-serial conversion (block: P/S). Finally, a cyclic prefix (block: add CP) is added, and the time-domain signal is transmitted over the doubly selective channel (block: h[n;l]). While travelling across the doubly selective channels, noise and distortion (v[n]) may be added, before the signal arrives at the receiver.

In the receiver the cyclic prefix is removed (block: remove CP) and the individual carriers are extracted from the received signal, which typically involves subjecting the signal to a Fourier transform, e.g., a discrete Fourier transform (block: DFT). This effectively makes the subcarriers and the information carried therein available in parallel, i.e., simultaneously. This signal in the frequency domain represents a complex vector Y. The received transmitted block, or received transmission block, is now available for channel estimation and equalisation, after which the symbols can be de-mapped into binary data and provided as a serial binary data stream, i.e., user payload.

The dispersion due to Doppler spread effectively requires a receiver to expect subcarriers carrying data symbols within a frequency range rather than at a certain frequency. The width of the dispersion increases, e.g., with the relative speed between transmitter and receiver.

For example, a received transmission block may be represented, in the frequency-domain, by a complex signal vector Y. The complex signal vector Y is determined by the transmitted complex information vector S of dimension N×1 and by the N×N complex channel matrix H. Thus, the signal vector Y may be written as $$Y = HS + V$$

The complex vector V of dimension N×1 represents noise and distortion that may be added.

FIGS. 2A and 2B show exemplary representations of elements of a channel matrix H without and with Doppler spread. The channel matrix H without Doppler spread shown in FIG. 2A is a clean diagonal matrix, while with Doppler spread the energy on the diagonal of the very same channel matrix H spreads into sub-diagonals and super-diagonals within a dispersion width $B_H$, as shown in FIG. 2B. With dispersion the received symbols may no longer be expected to be found at a certain frequency, but may be found within the entire dispersion width $B_H$.

As discussed above, in a typical receiver, after converting the signal received in the time domain into the frequency domain, e.g., by applying a DFT, properties of the channel are estimated in a channel estimation block and the symbols are detected or determined in an equaliser block, before they are de-mapped into binary data output.

Typical equalisers used in OFDM receivers include the least square (LS) equaliser, which tries detect symbols by minimising the Euclidian norm of the estimation error, the minimum mean square error (MMSE) equaliser, which tries to detect symbols by, as the name implies, minimising the mean of the squared estimation error, the message passing (MP) equaliser, which tries to detect symbols by solving a set of equations by message passing, and the maximum likelihood sequence estimation (MLSE) equaliser, which tries to find a sequence closest to the transmitted sequence.

While the complexities of LS, MMSE or MP equalisers are lower than the complexity of an MLSE equaliser, they also offer lower performance, which can appear as a high bit error rate. The high complexity of the MLSE equaliser, which grows exponentially with $B_H$, however, is not offset by its superior performance under ideal conditions, effectively prohibiting the use of MLSE equalisers in transmission systems that may suffer from high Doppler spread.

Various approaches for addressing the adverse effects of time and frequency dispersiveness in OFDM-based transmission systems have been proposed.

For example, I. Barhumi and M. Moonen, in "MLSE and MAP equalization for transmission over doubly selective channels," IEEE Trans. Veh. Technol., vol. 58, no. 8, pp. 4120-4128, October 2009., incorporated herein by reference, suggest an iterative channel estimation and equalization technique for OFDM signals transmitted over doubly selective channels, which is modelled as a complex-exponential basis expansion model (CE-BEM).

In "Pilot-assisted time-varying channel estimation for OFDM systems," IEEE Trans. Signal Process., vol. 55, no. 5, pp. 2226-2238 May 2007, Z. Tang, R. C. Cannizzaro, G. Leus, and P. Banelli, incorporated herein by reference, propose a pilot-assisted time-varying CE scheme for doubly selective channels modelled by CE-BEM, and using a minimum mean square error equaliser for symbol detection.

A structured distributed compressive sensing method exploiting the sparsity of doubly selective channels in the delay domain is proposed by P. Raviteja, K. T. Phan, Y. Hong and E. Viterbo, in "Interference Cancellation and Iterative Detection for Orthogonal Time Frequency Space Modulation," IEEE Transactions on Wireless Communications, vol. 17, no. 10, pp. 6501-6515 October 2018, doi: 10.1109/TWC.2018.2860011, which is incorporated herein by reference.

An iterative channel estimation and equalization scheme for MIMO-OFDM signals transmitted over doubly selective channels is proposed by K. Zhong, X. Lei and S. Q. Li, in "Iterative channel estimation and data detection for MIMO-OFDM systems operating in time-frequency dispersive channels under unknown background noise", EURASIP Journal on Wireless Communications and Networking 2013, 2013:182, which is incorporated herein by reference.

However, all the known channel estimation and equalisation mechanisms exhibit a relatively high complexity or a far-from-optimal bit error rate performance.

SUMMARY OF THE INVENTION

An aspect of the present invention aims to provide a low-complexity iterative method of determining symbols transmitted in a transmission block over a doubly selective OFDM transmission channel that has an improved bit error rate. It is a further aspect of the present invention aims to provide a receiver implementing the method.

In accordance with an aspect of the invention a method of determining symbols transmitted in a transmission block over a wireless channel using orthogonal frequency division multiplexing, referred to as OFDM transmission channel in the following, is provided. The transmission block comprises at least one data sub-block and at least one pilot sub-block. The pilot sub-block and the data sub-block each contain at least one carrier frequency. In case of more than one data sub-block and/or pilot sub-block the pilot sub-block and the data sub-block may be multiplexed, as shown in the frequency domain representation of FIG. 3.

The exemplary transmission block shown in FIG. 3 comprises three sub-blocks, each containing a data sub-block and a pilot sub-block. Each pilot sub-block includes a pilot tone in the centre, surrounded by a number of null subcarriers on both sides. The placement of null subcarriers on both sides of the pilot tone is necessary in fast fading conditions, because otherwise the Doppler spread will introduce interference between pilot and data and distort the OFDM signal, which will negatively affect the channel estimation. Optimized pilot positions (not shown in the figure) may further improve the channel estimation performance.

The method comprises receiving, in the frequency domain, a transmission block transmitted via the OFDM communication channel, and performing, in the frequency domain, a pilot-aided first channel estimation function on the received transmission block. The received transmission block may previously have been converted from the time domain to the frequency domain, e.g., by subjecting it to a discrete Fourier transformation (DFT) function. The output of the first channel estimation function is a set of channel frequency response coefficients.

In accordance with the method the received transmission block and the output of the pilot-aided first channel estimation function are provided to a first channel equalisation function, for estimating data symbols transmitted in the received transmission block. An output of the first channel equalisation function is a set of first-iteration estimated symbols. The set of estimated data symbols in this first iteration comprises at least one estimated symbol, and may not provide valid estimations for all symbols.

In a next step of the method the received transmission block and the set of first-iteration estimated symbols are provided to a data-aided second channel estimation function, marking the start of a new iteration. The second and further iterations do not use the first channel estimation function or the first channel equalisation function that were invoked in the very first iteration, but rather repeatedly use a different channel estimation and a different channel equalisation function than in the first iteration, along with an adjustable interference cancellation function.

The pilot-aided first and the data-aided second channel estimation function may apply a basis expansion model, which converts a number of time-varying channel coefficients into a smaller number of time-invariant basis expansion model coefficients. Basis expansion model algorithms for channel estimation may include oversampled basis expansion model, which is known to reduce the modelling error at the cost of increased noise sensitivity.

The symbols from the set of first iteration symbols are used as pseudo pilot symbols, allowing to perform channel estimation for subcarriers that have no real pilot. The data-aided second channel estimation function thus can perform a channel estimation on the basis of a larger set of known pilots and estimated symbols, improving the accuracy of the channel estimation. The output of the data-aided second channel estimation function is a set of channel frequency response coefficients for the current iteration.

Next, the received transmission block, the set of first-iteration estimated symbols and the output of the data-aided second channel estimation function are provided to an adjustable interference cancellation function. The output of the interference cancellation function is a representation of the received transmission block with reduced or at least partly removed intercarrier interference in the received transmission block.

The interference cancellation function can only be invoked after the set of first-iteration estimated symbols is available, because for proper interference cancellation the transmitted symbols must be known. As the transmitted symbols are normally not initially known at the receiver, an aspect of the invention also uses the data symbols from the set of first-iteration estimated symbols, along with the known pilots, as an approximation of the transmitted symbols for the interference cancellation.

The output of the interference cancellation function and the output of the data-aided second channel estimation function are then provided to a second equaliser function, for estimating symbols transmitted in the received transmission block. An output of the second equaliser function is a set of i-th-iteration estimated symbols, i being larger than 1, wherein each set of i-th-iteration estimated symbols may include the set of the estimated symbols from the previous iteration as a subset. Symbols in the set of the estimated symbols from the previous iteration may be replaced or updated in each iteration.

In a next iteration the output of the second equaliser function and the received transmission block are provided to the data-aided second channel estimation function and the interference cancellation function, respectively. This iteration is repeated until a predetermined termination condition is fulfilled. The sets of estimated symbols of early iterations may not provide valid estimations for all symbols, and subsequent iterations may provide ever complete sets of estimated symbols.

The predetermined termination condition may be fulfilled, e.g., when all symbols are properly received and can be validly de-mapped into binary data output based or when sufficient symbols are received for de-mapping and reconstructing into binary data output based on forward error correction, or when a predetermined number of repetitions is reached, or the like.

The method according to an aspect of the invention advantageously combines a first equaliser, preferably of low complexity or low performance, which provides an initial input to a data aided channel estimation, and uses the initial input and the output of the data aided channel estimation for performing an adjustable interference cancellation on the received signal before providing a representation of the received signal with reduced or at least partly removed interference and the latest channel estimation to a second equaliser, including equalisers of a higher complexity or a higher performance. An aspect of the invention makes use of the finding that the penalty, inter alia in terms of speed, that is typically associated with higher complexity or higher performance equalisers largely depends on the magnitude of signal dispersion as found in doubly-selective transmission channels, which signal dispersion may be kept low by performing adjustable interference cancellation. Iteratively repeating the channel estimation, adjustable interference cancellation and high-complexity or high-performance equalisation can quickly lead to a converging a set of estimated symbols that has a BER low enough for de-mapping into a binary data output.

The first equaliser function preferably has a computational complexity or performance that is lower than the computational complexity or performance of the second equaliser function. The first equaliser may be of a simpler design or lower performance than the second equaliser. The computational complexity in this context may be considered as being related to the number of operations which are needed to come to a result. The computational complexity may depend from a number of possible sets symbols that need to be analysed, each symbol in a set of symbols having a probability assigned, for arriving at a most likely set of symbols. It is readily apparent that a higher number of possible sets of symbols requires more computation than a lower number. However, the computational complexity for identical numbers of possible sets of symbols may significantly differ depending on the equaliser function invoked as, e.g., some in equaliser functions the number of operations may increase logarithmic with the number of possible sets of symbols, while in others the number may increase exponentially. The performance may be considered as a measure of the accuracy of the result of the estimation of the symbols, or which probability can be assigned to an estimated symbol. A low-performance may result in lower accuracy in the estimation, or the results of the estimation may have lower probabilities of being correct, but the result may be available faster. A high-performance may be related to a higher precision of the results, or the results may have higher probabilities of being correct.

In one or more embodiments the first equaliser function implements a message passing (MP) or a minimum mean square error (MMSE) equaliser.

In one or more embodiments the second equaliser function implements a maximum likelihood sequence estimation (MLSE) equaliser.

In one or more embodiments the interference cancellation function is arranged to cancel the intercarrier interference on non-zero sub-diagonals and super diagonals of the channel matrix H in the frequency domain and to convert the channel matrix H into a banded diagonal matrix $H_b$ with an adjustable dispersion width $B_{Hb}$ that is smaller than that of the original channel matrix H. A smaller value of $B_{Hb}$ reduces the complexity of the MLSE equaliser at the expense of a small performance degradation, and vice versa. However, as the output of the second equaliser function is provided iteratively to the second channel estimation function, controlled adjusting of the dispersion width $B_{Hb}$ of the banded diagonal matrix $H_b$ that is output from the interference cancellation with each iteration may help providing improved channel frequency response coefficients in the next iteration, which may in turn allow for an improved interference cancellation, which eventually helps the second equalizer function to provide results faster.

An OFDM receiver in accordance with an aspect of the present invention has a first channel estimation block adapted to perform a pilot-aided channel estimation on a received transmission block in a frequency domain. An output of the first channel estimation block, which is a set of channel frequency response coefficients, is provided, along with the received signal in the frequency domain, to a first equaliser block that is adapted to perform, in the frequency domain, a symbol detection function on the received transmission block. The transmission block may previously have been converted from the time domain to the frequency domain, e.g., in a block performing a Fourier transformation function on a signal received in the time domain. The output of the first equaliser block, which is a set of first-iteration estimated symbols, is provided, along with the received signal in the frequency domain, to a second channel estimation block. The second channel estimation block provides data-aided channel estimation and outputs a second-iteration set of channel frequency response coefficients to an adjustable interference cancellation block, which also receives the set of first-iteration estimated symbols from the first equaliser block and the received signal in the frequency domain. The adjustable interference cancellation block is adapted to determine and output a representation of the received transmission block with reduced or at least partly removed intercarrier interference. The output of the adjustable interference cancellation block and the second-iteration set of channel frequency response coefficients are provided to a second equaliser block, which is adapted to estimate symbols, in the representation of the received signal in the frequency domain as output by the interference cancellation block. The output of the second equaliser block is a set of i-th-iteration estimated symbols, i being larger than 1. Each set of i-th-iteration estimated symbols may include the set of the estimated symbols from the previous iteration as a subset. The output of the second equaliser block is provided to the second channel estimation block and the interference cancellation block, for iteratively repeating the channel estimation, the interference cancelling and the symbol estimation. The output of the second equaliser block is also provided to a de-mapping block, for converting the received symbols into binary data.

In one or more embodiments of the OFDM receiver the pilot-aided first channel estimation block and/or the data-aided second channel estimation block are adapted to perform a function applying a basis expansion model.

In one or more embodiments of the OFDM receiver the first equaliser block is adapted to perform a message passing or a minimum mean square error (MMSE) equaliser function.

In one or more embodiments of the OFDM receiver the second equaliser block is adapted to perform a maximum likelihood sequence estimation (MLSE) equaliser function.

The various blocks of the OFDM receiver in accordance with an aspect of the invention may be implemented in software running on a general-purpose computer, in dedicated hardware and or in combinations thereof. A computer program product comprises computer program instructions which, when executed by a microprocessor, cause the computer, and/or control the dedicated hardware, to execute the method in accordance with one or more of the embodiments of the invention presented hereinbefore.

The computer program product may be stored on a computer-readable medium or data carrier. The medium or the data carrier may by physically embodied, e.g., in the form of a hard disk, solid state disk, flash memory device or the like. However, the medium or the data carrier may also comprise a modulated electro-magnetic, electrical, or optical signal that is received by the computer by means of a corresponding receiver, and that is transferred to and stored in a memory of the computer.

BRIEF DESCRIPTION OF THE DRAWINGS

In the following section aspects of the invention will be described with reference to the drawings, in which.

DETAILED DESCRIPTION OF THE PREFERRED EMBODIMENTS

Figure 1:
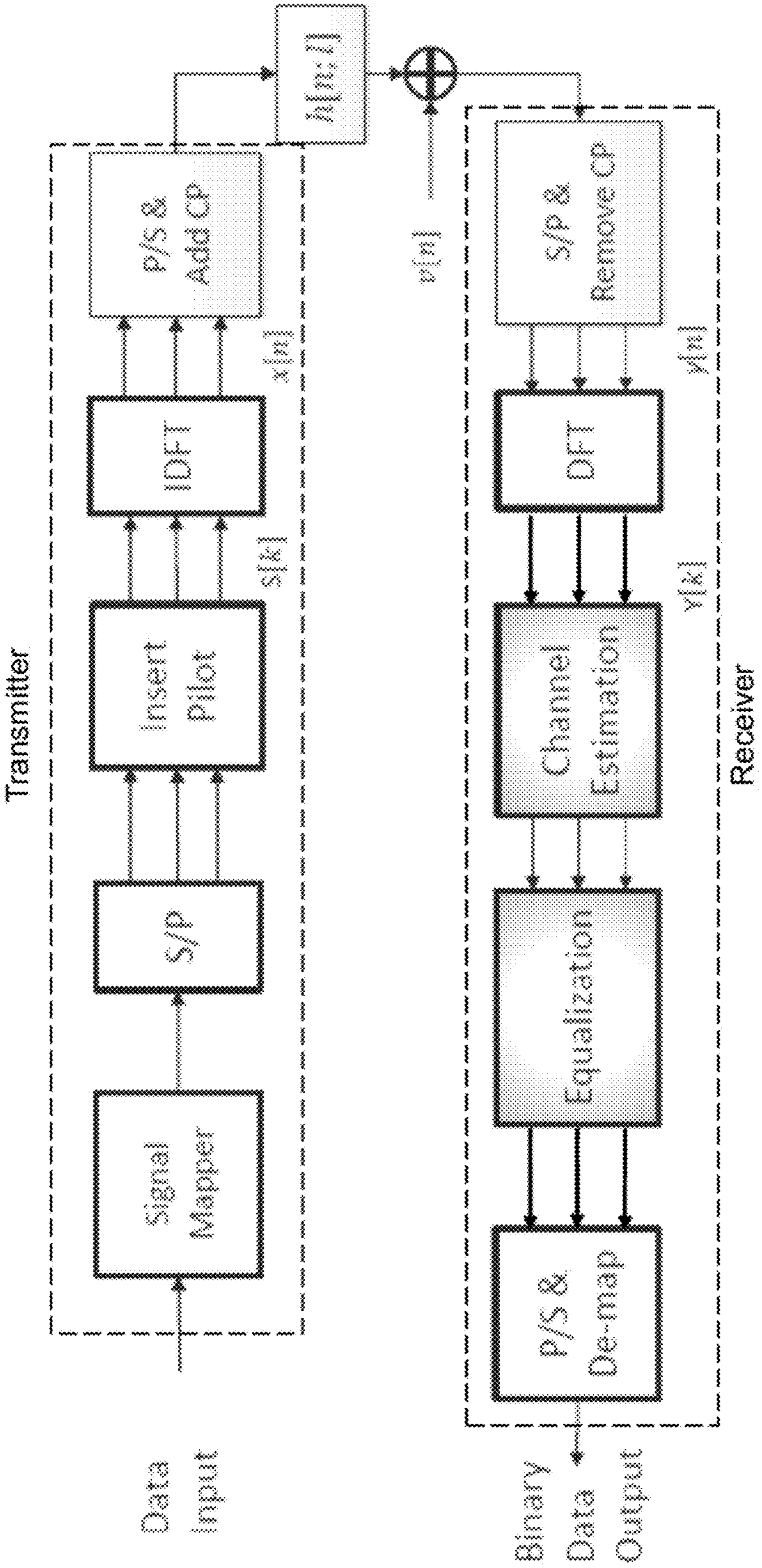
FIG. 1 shows an exemplary representation of an OFDM communication system.
Figure 2A:
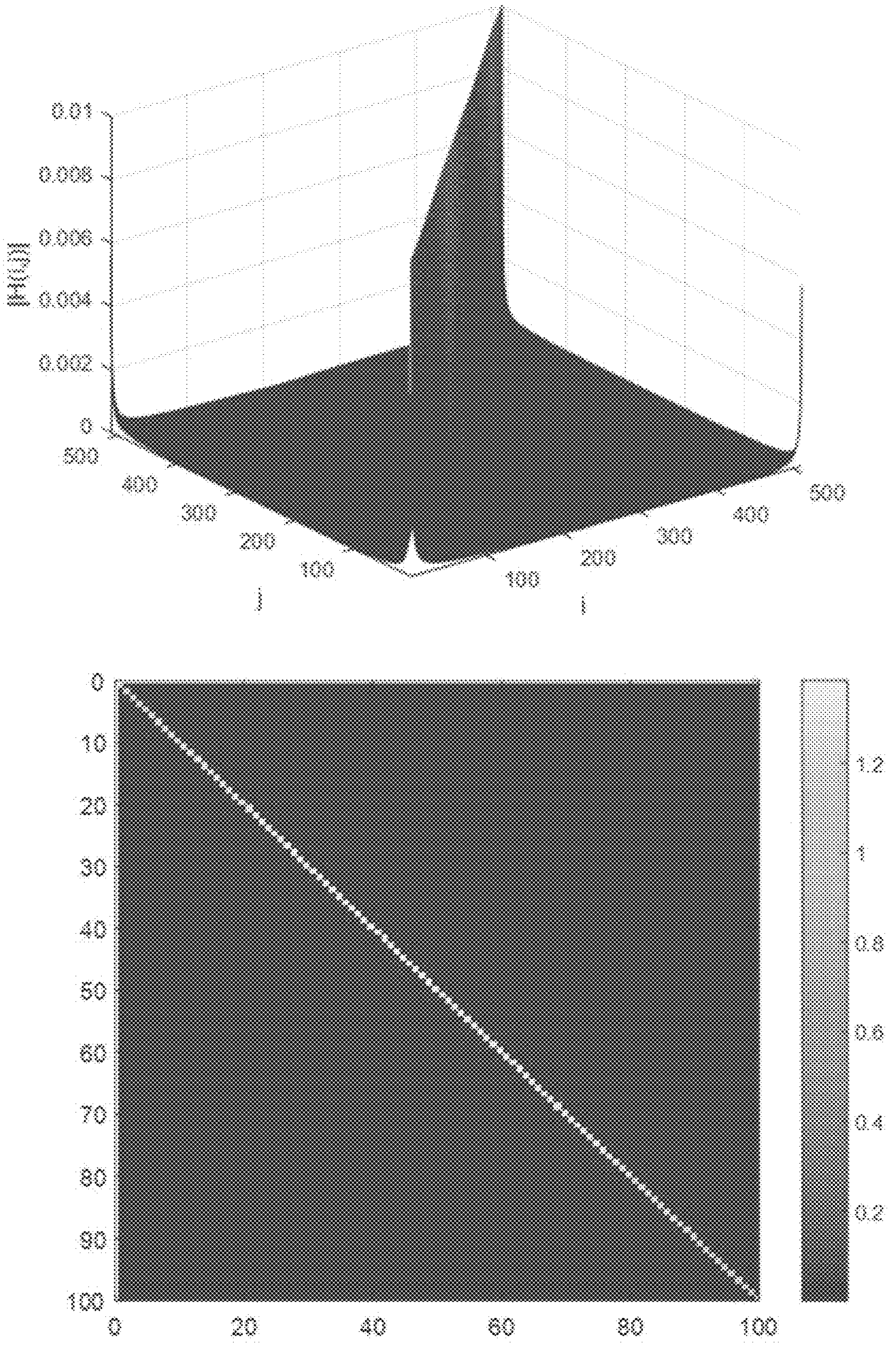
FIG. 2A, 2B shows exemplary representations of elements of a channel matrix H without and with Doppler spread
Figure 2B:
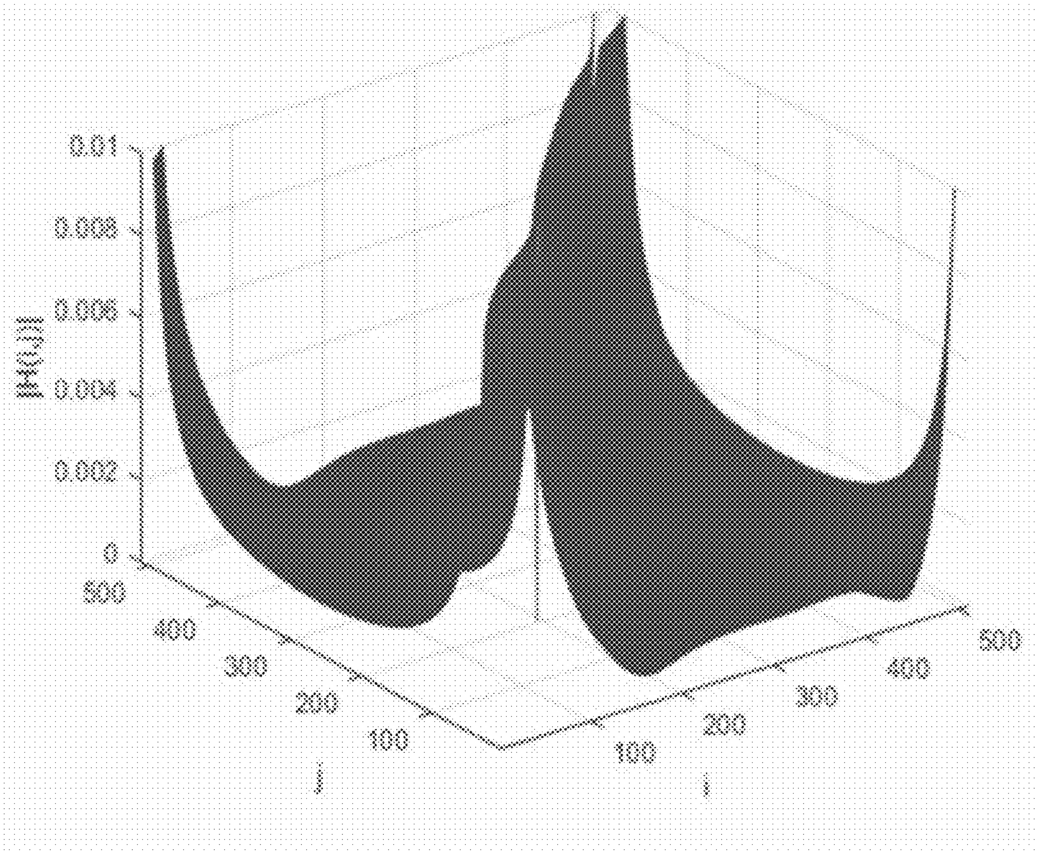
Figure 2B:
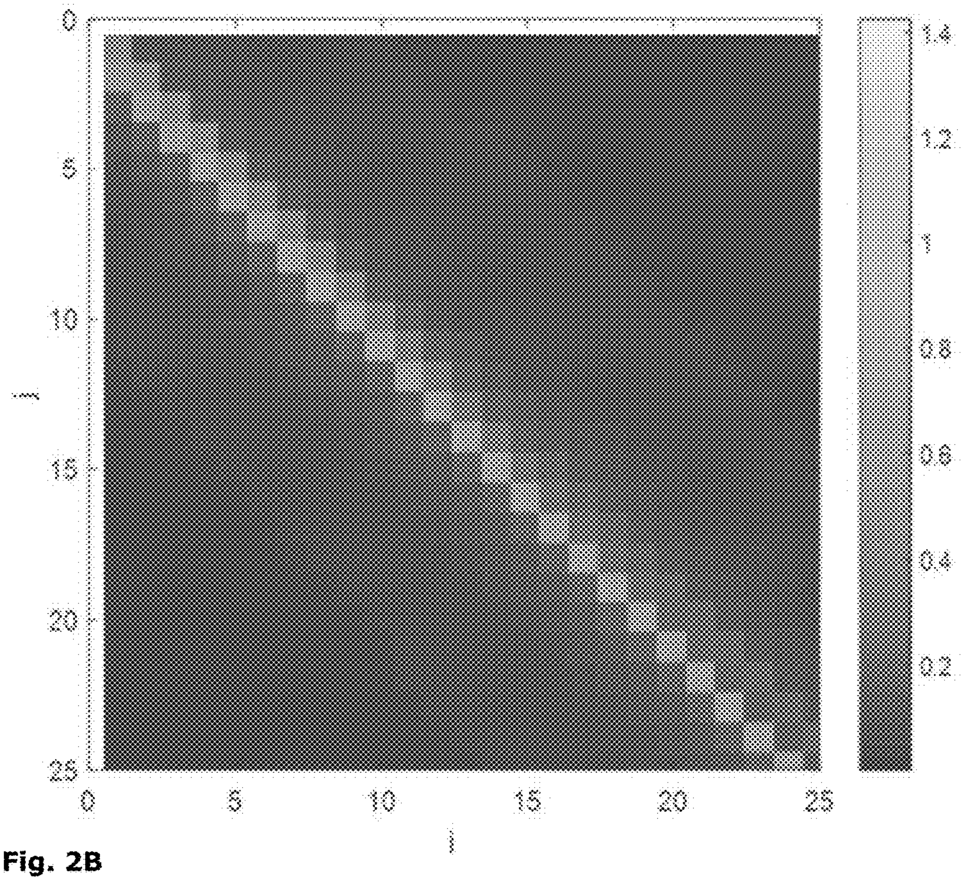
Figure 3:
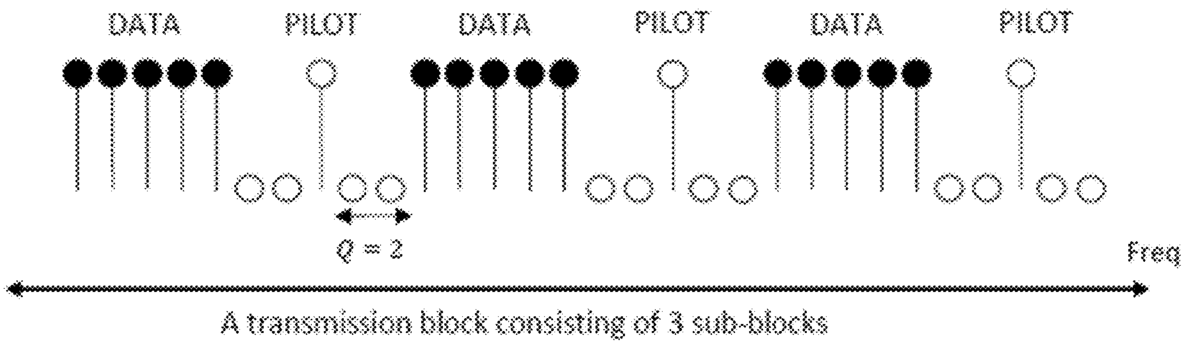
FIG. 3 shows an exemplary transmission block comprising data and pilot sub-blocks in a frequency domain representation.
Figure 4:
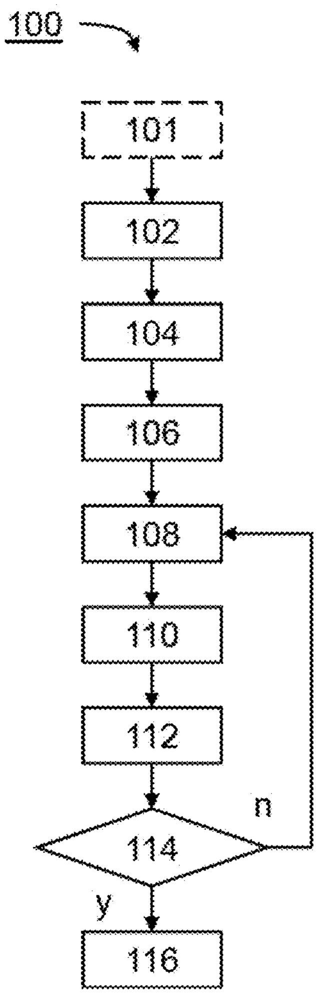
FIG. 4 shows a flow diagram of an exemplary method in accordance with the invention.

FIGS. 1, 2A, 2B, and 3 have been described further above and will not be discussed again. FIG. 4 shows a flow diagram of an exemplary method 100 in accordance with the invention. In step 102 a transmission block transmitted over the OFDM transmission channel is received, in the frequency domain, i.e., after a Fourier transformation and removing the cyclic prefix in step 101. In step 104 a pilot-aided first channel estimation function is performed on the received transmission block. The output of the channel estimation is a set of channel frequency response coefficients for the transmission channel. In step 106 the received transmission block and the channel frequency response coefficients for the transmission channel are subjected to a first channel equalisation function. The output of the first channel equalisation function is a set of first-iteration estimated symbols, which are subjected, in step 108, along with the received transmission block, to a data-aided second channel estimation function. The output of the data-aided second channel estimation function is a further set of channel frequency response coefficients, also referred to as second-iteration set of channel frequency response coefficients, as this is the second channel estimation. In step 110 the second-iteration set of channel frequency response coefficients and the set of first-iteration estimated symbols are subjected to an adjustable interference cancellation function, which outputs a representation of the received transmission block with reduced or at least partly removed intercarrier interference. Next, in step 112, the representation of the received transmission block output from the interference cancellation function and the second-iteration set of channel frequency response coefficients are subjected to a second equaliser function. The output of the second equaliser function is a set of second-iteration estimated symbols, as this is the second time a symbol determination has been carried out on the received transmission block, or a representation thereof. In step 114 the method checks if a termination condition is fulfilled. If the termination condition is not fulfilled, "no"-branch of step 114, the set of second-iteration estimated symbols and the received transmission block are subjected to the data-aided second channel estimation function in step 108, and the process is repeated in a next iteration, until the termination condition is fulfilled. In this case, "yes"-branch of step 114, the set of final-iteration estimated symbols may be provided, in step 116, to a de-mapper, for producing a binary data output.

Figure 5:
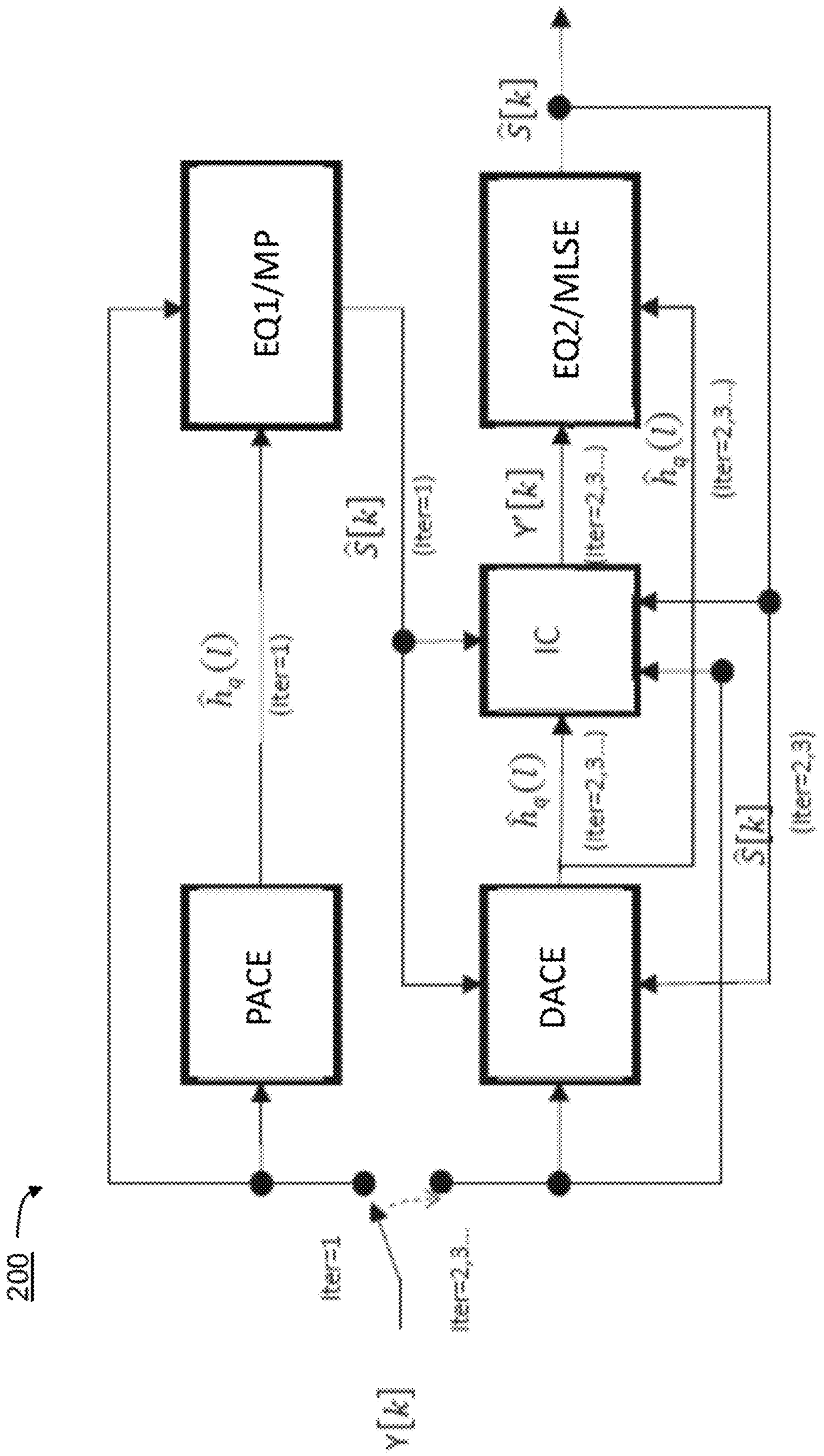
FIG. 5 shows a block diagram of an exemplary receiver in accordance with the invention.

FIG. 5 shows a block diagram of an exemplary OFDM receiver 200 in accordance with the invention. A received transmission block Y[k] is input to a first pilot-aided channel estimation function block PACE and to a first equaliser function block EQ1/MP, which also receives the output of the first pilot-aided channel estimation function block PACE. The output of the first first equaliser function block EQ1/MP is provided to an interference cancellation function block IC and a second data-aided channel estimation function block DACE. The output of the second data-aided channel estimation function block DACE is also provided to the interference cancellation function block IC. The output of the interference cancellation function block IC is provided to a second equaliser function block EQ2/MLSE, whose output is provided to a de-mapper (not shown in the figure), and to the interference cancellation function block IC and the second data-aided channel estimation function block DACE, allowing for iteratively improving the channel estimation, interference cancellation and equalisation.

The method and apparatus described hereinbefore provide a signal detection that offers low overall complexity and thus allows for low hardware cost and energy consumption. In addition, the method and apparatus provide fast convergence of the signal detection, which results in a low processing delay.

The present method and apparatus may be useful in future 6G communication systems, and may also be adopted in lightly modified 5G networks.

The invention claimed is:

1. A method of determining symbols transmitted in a transmission block (S[k]) over a wireless channel using orthogonal frequency division multiplex, the transmission block (S[k]) comprising at least one data sub-block and at least one pilot sub-block, the method comprising:

a) receiving, in the frequency domain, a transmission block (Y[k]) transmitted via the OFDM transmission channel, b) performing a pilot-aided first channel estimation function on the received transmission block (Y[k]), c) providing the received transmission block (Y[k]) and the output ($\hat{h}_q(l)_1$) of the pilot-aided first channel estimation function to a first channel equalisation function, wherein an output of the first channel equalisation function is a set of first-iteration estimated symbols ($\hat{S}[k]_1$), d) providing the received transmission block (Y[k]) and the set of first-iteration estimated symbols ($\hat{S}[k]_1$) to a data-aided second channel estimation function, e) providing the received transmission block (Y[k]), the set of first-iteration estimated symbols ($\hat{S}[k]_1$) and the output ($\hat{h}_q(l)_i$) of the data-aided second channel estimation function to an adjustable interference cancellation function, f) providing the output ($\hat{h}_q(l)_i$) of the data-aided second channel estimation function and the output (Y'[k]) of the adjustable interference cancellation function to a second equaliser function, wherein an output of the second equaliser function is a set of i-th-iteration estimated symbols ($\hat{S}[k]_i$), i being larger than 1, wherein each set of i-th-iteration estimated symbols ($\hat{S}[k]_i$) may include the set of the estimated symbols ($\hat{S}[k]_{i-1}$) from the previous iteration as a subset, g) repeating steps e) and f), wherein the received transmission block (Y[k]) and the i-th-iteration set of estimated symbols ($\hat{S}[k]_i$) is iteratively provided to the data-aided second channel estimation function and the adjustable interference cancellation function, respectively, until a predetermined termination condition is fulfilled.

2. The method of claim 1, wherein the first channel equalisation function has a computational complexity or performance that is lower than that of the second channel equalisation function.

3. The method of claim 1, wherein the pilot-aided first channel estimation function and/or the data-aided second channel estimation function apply a basis expansion model.

4. The method of claim 1, wherein the first channel equalisation function implements a message passing or a minimum mean square error equaliser.

5. The method of claim 1, wherein the second channel equalisation function implements a maximum likelihood sequence estimation equaliser.

6. The method of claim 1, wherein the interference cancellation function is adjustable and is arranged to cancel the intercarrier interference on the non-zero sub-diagonals and super diagonals of the channel matrix (H) in the frequency domain and to convert the channel matrix (H) into a banded diagonal matrix ($H_b$) with a dispersion width smaller than that of the original channel matrix (H).

7. An OFDM receiver having a first channel estimation block adapted to perform a pilot-aided channel estimation on a received transmission block (Y[k]) in the frequency domain, an output of which first channel estimation block is provided, along with the received signal (Y[k]) in the frequency domain, to a first equaliser block, wherein an output of the first equaliser block is provided, along with the received signal (Y[k]) in the frequency domain, to a second channel estimation block, adapted to perform a data-aided channel estimation on a received transmission block, wherein an output of the second channel estimation block is provided, along with the output ($\hat{S}[k]_1$) of the first equaliser block and the received transmission block (Y[k]) in the frequency domain, to an interference cancellation block, wherein the output (Y'[k]) of the interference cancellation block and the output ($\hat{h}_q(l)_{i;\ i=2\ \ldots}$) of the second channel estimation block are provided to a second equaliser block, wherein the output ($\hat{S}[k]_{i;\ i=2\ \ldots}$) of the second equaliser block is provided to a de-mapping block, and is provided to the second channel estimation block and the interference cancellation block, for allowing an iterative repetition of channel estimation, interference cancellation and equalisation for a received transmission block (Y[k]) in the frequency domain.

8. The OFDM receiver of claim 7, wherein the pilot-aided first channel estimation block and/or the data-aided second channel estimation block are adapted to perform a function applying a basis expansion model.

9. The OFDM receiver of claim 7, wherein the first equaliser block is adapted to perform a message passing or a minimum mean square error equaliser function.

10. The OFDM receiver of claim 7, wherein the second equaliser block is adapted to perform a maximum likelihood sequence estimation equaliser function.

11. A wireless device with an OFDM receiver according to claim 7.

12. A non-transitory computer program product comprising computer program instructions which, when executed by a microprocessor, cause the computer, and/or control hardware components of an OFDM receiver having a first channel estimation block adapted to perform a pilot-aided channel estimation on a received transmission block in the frequency domain, an output of which first channel estimation block is provided, along with the received signal in the frequency domain, to a first equaliser block, wherein an output of the first equaliser block is provided, along with the received signal in the frequency domain, to a second channel estimation block, adapted to perform a data-aided channel estimation on a received transmission block, wherein an output of the second channel estimation block is provided, along with the output of the first equaliser block and the received transmission block in the frequency domain, to an interference cancellation block, wherein the output of the interference cancellation block and the output of the second channel estimation block are provided to a second equaliser block, wherein the output of the second equaliser block is provided to a de-mapping block, and is provided to the second channel estimation block and the interference cancellation block, for allowing an iterative repetition of channel estimation, interference cancellation and equalisation for a received transmission block in the frequency domain, to execute the method of claim 1.

13. A non-transitory computer readable medium retrievably storing the computer program product of claim 12.

* * * * *